United States Patent [19]
Scharff et al.

[11] 3,862,236
[45] Jan. 21, 1975

[54] PRODUCTION OF PROPIONALDEHYDE
[75] Inventors: Gerhard Scharff, Leverkusen;
 Manfred Martin, Cologne;
 Wolfgang Swodenk,
 Odenthal-Globusch; Wolfram Dornfeldt, Leichlingen; Johann Grolig, Leverkusen, all of Germany
[73] Assignee: Bayer Aktiengesellschaft,
 Leverkusen, Germany
[22] Filed: Nov. 6, 1970
[21] Appl. No.: 87,394

[30] Foreign Application Priority Data
 Nov. 28, 1969 Germany............................ 1959776
 Nov. 28, 1969 Germany............................ 1959780

[52] U.S. Cl. ....... 260/603 R, 260/497 R, 260/638 R
[51] Int. Cl.............................................. C07c 45/16
[58] Field of Search....... 260/603 HF, 497 A, 638 R

[56] References Cited
 UNITED STATES PATENTS
 2,011,317  8/1935  Groll............................... 260/603 R
 2,428,590  10/1947 Shokal et al..................... 260/497 A
 2,441,540  4/1948  Ash et al............................. 260/638
 3,156,735  11/1964 Armstrong...................... 260/603 R
 3,190,912  6/1965  Robinson......................... 260/497 A

OTHER PUBLICATIONS

Okada et al., Chemical Abstracts, Volume 72, p. 277, 1970.
Dewolfe et al., Chemical Reviews, Vol. 56, pp. 757,758,786 and 878, 1956.
Okada et al., Chemical Abstracts, Volume 72, page 277, 1970.
Sabatier, Catalysis in Org. Chem., 1923, p. 658.
Dewolfe et al., Chemical Reviews, Vol. 56, pages 757, 758, 786 and 787, 1956.
Okada et al., Chemical Abstracts.

*Primary Examiner*—Bernard Helfin
*Assistant Examiner*—R. H. Liles
*Attorney, Agent, or Firm*—Burgess, Dinklage & Sprung

[57] ABSTRACT

A process comprising passing allyl alcohol in the gas phase over a palladium catalyst at elevated temperature, whereby the allyl alcohol is converted to propionaldehyde. The allyl alcohol may be produced by reacting propylene with oxygen and acetic acid to form a product containing allyl acetate which is hydrolyzed to allyl alcohol and acetic acid, the acetic acid being recycled.

9 Claims, 1 Drawing Figure

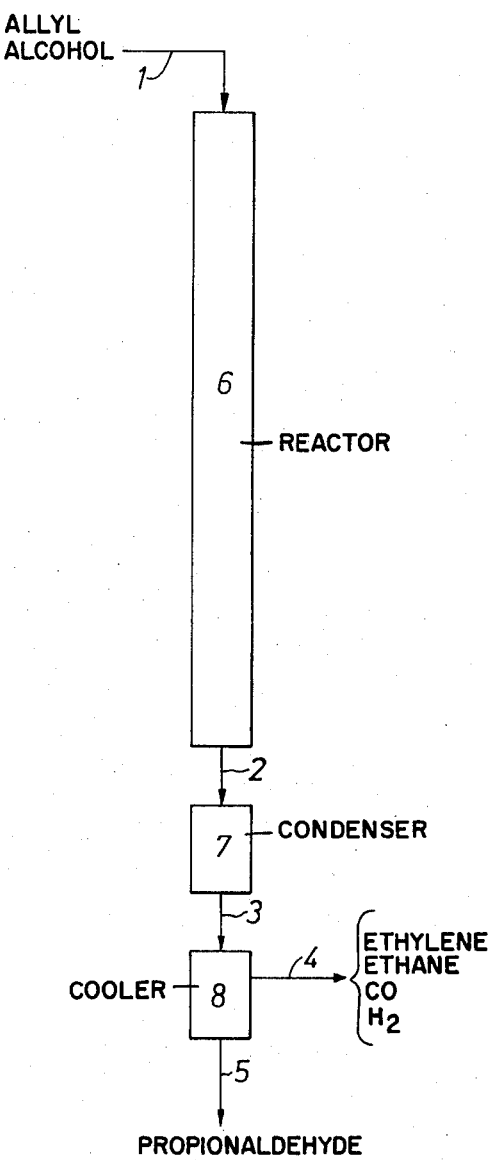

PRODUCTION OF PROPIONALDEHYDE

This invention relates to a commercially practical process for the production of propionaldehyde from allyl alcohol.

It is known that propionaldehyde can be obtained by reacting ethylene with carbon monoxide and hydrogen (oxosynthesis).

It has now been found that propionaldehyde can be obtained in an economically advantageous, and therefore commercially practical, manner by passing allyl alcohol in the gaseous phase at an elevated temperature over a catalyst containing palladium.

The reaction can be carried out at reduced pressure, normal pressure or at elevated pressure. The reaction temperatures are variable within wide limits. For example the reaction can be carried out at a temperature of from about 50° to 250°C and preferably at a temperature of from about 100° to 200°C and at a pressure of up to about 10 atmospheres gauge.

The reaction is advantageously carried out in the absence of oxygen. The absence of oxygen favorably affects both the activity and the selectivity of the catalyst. By operating in the absence of oxygen, it is possible to avoid the formation of acrolein which otherwise would be extremely difficult to separate from the desired propionaldehyde.

The reaction can be carried out in the presence of organic or inorganic compounds, for example in the presence of one or more of water vapor, gaseous acetic acid, allyl acetate, nitrogen, hydrogen, carbon monoxide and carbon dioxide.

In general, the reaction is carried out by converting a large proportion of the allyl alcohol used into propionaldehyde in a single pass. Conversions of from 50 to 100%, for example, take place in a single pass. Propionaldehyde is formed as the main product during the reaction. In addition, secondary products such as hydrogen, ethylene, ethane and carbon monoxide can occur in fluctuating quantities. The temperature, throughput rate and the presence of diluents for the allyl alcohol are all of significance so far as the formation of the secondary products are concerned. As already mentioned, suitable diluents for the allyl alcohol to be reacted include organic or inorganic compounds in whose presence the reaction can be carried out. By virtue of the process according to the invention, it is possible to obtain selectivities of at least 90% for conversions of from 50 to 100% in a single pass.

The catalysts used for the reaction contain palladium in the form of palladium metal or in the form of palladium compounds. It is preferred to use a catalyst which contains the palladium on a support. It is possible to use a variety of supports, for example, silica, aluminum silicates, active carbon, aluminum oxide and aluminum spinel. Suitable palladium concentrations on the support are for example from about 0.01 to 10% by weight and preferably from about 0.1 to 2% by weight, calculated as free metal. It is possible to use a catalyst which contains only palladium metal on a uniform support such as $SiO_2$ for example, although it is also possible to use a catalyst which in addition to the palladium or palladium compound contains other metals or metal compounds such as platinum, ruthenium, gold, nickel, copper, molybdenum, vanadium, chromium, manganese, iron and compounds of the alkali metals and alkaline earth metals.

Where they are supported, the catalysts used for the reaction advantageously contain from about 0.1 to 10 g, more particularly about 0.1 to 5 g, of palladium per liter of the catalyst. In cases where, in addition to palladium, other metals or metal compounds are used, the catalysts may advantageously contain in addition from about 0.1 to 5 g of the metal or metal compounds, for example gold, per liter of the catalyst.

The gaseous reaction products can be cooled under the reaction pressure, usually resulting in the formation of a liquid phase which contains a large proportion of the propionaldehyde formed together with the unreacted allyl alcohol and the condensible compounds optionally present in the starting material, for example nitrogen, hydrogen, and carbon dioxide, as well as, corresponding to the vapor pressure of the propionaldehyde, certain quantities of propionaldehyde and optionally certain quantities of allyl alcohol, water, and acetic acid, as well as the gaseous reaction products formed during the reaction such as carbon monoxide, hydrogen, ethylene and ethane. The propionaldehyde can then be isolated from the liquid phase by distillation. The distillation residue of the higher-boiling compounds such as allyl alcohol and water for example can then be recycled to the reaction through an evaporator. The propionaldehyde present in the gaseous product can be separated by suitable physical processes such as fractional condensation or extraction.

However, it is also possible to recycle the gaseous phase to the reaction vessel without separating the propionaldehyde present in it. Since in cases where the reaction is optimally carried out there is usually formed a small quantity of gaseous secondary product such as hydrogen, carbon monoxide, ethane and ethylene, the proportion of these compounds will rise where the gas is completely recycled. For this reason, it is necessary to remove some of these gaseous reaction products from the recycled gas.

Pure allyl alcohol may be used as the starting material for the production of propionaldehyde, although it is also possible to use mixtures containing allyl alcohol such as mixtures containing water, like the azeotrope of allyl alcohol and water which contains approximately 27% of water, as well as aqueous solutions of allyl alcohol, mixtures of allyl alcohol, water and acetic acid or mixtures of allyl alcohol, water, acetic acid and allyl acetate. In cases where pure allyl alcohol is not used as the starting material, it is undesirable in some cases completely to recycle the liquid reaction products after separation of the propionaldehyde because the proportion of these products in the starting material would build up. In this case, it is best suitably to remove some of these compounds, for example water and acetic acid, from the circuit.

The catalyst can be used for example in the form of pellets, slugs or beads, for example in the form of beads from 4 to 6 mm in diameter.

The catalysts can be prepared in different ways. For example, the support can be impregnated with palladium in the form of a soluble salt, for example in the form of an aqueous sodium palladate solution. The catalyst can then be treated with an aqueous reducing agent, for example hydrazine, and the palladium reduced to palladium metal. It is also possible, however, to carry out reduction with a gaseous reducing agent such as hydrogen for example. The support may also be impregnated with the palladium compound which is then converted by treatment with an alkali metal hydroxide into a water-insoluble palladium compound, for example palladium hydroxide. The catalysts obtained after the treatment described above can be freed from inorganic salts, for example alkali metal chlorides, by washing and then dried. In cases where the palladium salts are converted into palladium hydroxide, the catalyst can be reduced to the metal form either before or after washing by an aqueous or gaseous reducing agent such as hydrazine or hydrogen or ethylene. It is also possible to impregnate the support with an organic palladium compound, for example palladium acetate or palladium acetyl acetonate, in solution in a suitable solvent, followed by drying at temperatures of from about 50° to 150° for example. The catalysts thus obtained can be directly placed in the reactors. By passage over the catalyst of gases containing gaseous allyl alcohol, as well as by means of the compounds formed as secondary products, such as hydrogen and carbon monoxide, the palladium compounds can be reduced to palladium metal in the reactor.

In cases where in addition to palladium the catalyst contains additions of other metals or metal compounds, the catalyst can be prepared by impregnating the support with an organic palladium compound, for example palladium acetyl acetonate, together with a soluble metal salt, for example iron acetyl acetonate, in a suitable solvent, followed by drying. In cases where gold is added to the palladium, it is of advantage for example to impregnate the support with an aqueous sodium palladate solution and an aqueous solution of tetrachloroauric acid followed by treatment with an alkali metal hydroxide to promote conversion into water-insoluble noble metal compounds, for example palladium hydroxide and gold hydroxide. The catalysts obtained after the treatment described above can be washed with water to free them of inorganic salts, for example alkali metal chlorides, and then dried. As already mentioned, the catalysts thus obtained can also be reduced into palladium metal before or after washing by aqueous or gaseous reducing agents such as for example hydrazine, hydrogen or ethylene.

The reaction can be carried out in different kinds of reactors, for example in tubular reactors, in fluidized-bed reactors and in shaft furnaces. The reaction is preferably carried out in tubular reactors. Suitable dimensions of the reaction tubes are, for example, lengths of from about 4 to 8 meters and internal diameters of, for example, from 20 to 50 mm.

In one commercially advantageous embodiment of the process according to the invention, allyl alcohol is obtained by treating propylene in a first stage with oxygen and acetic acid in the gaseous phase in the presence of a catalyst containing palladium to form allyl acetate which is then hydrolyzed in a second stage to form allyl alcohol. For this purpose, a mixture of acetic acid and water can be evaporated in the first stage in a stream of propylene, followed by the addition of oxygen, after which a liquid reaction product consisting essentially of allyl acetate, water and acetic acid is obtained from the gaseous reaction product by condensation. This mixture can be treated in the liquid phase with an acid cation enchanger, resulting in the formation of a liquid porduct consisting essentially of allyl acohol, allyl acetate, water and acetic acid, following mechanical separation of the catalyst.

This crude reaction mixture may be used as the starting material for the production of propionaldehyde by the process according to the invention. The allyl alcohol present in the reaction mixture is converted at least in part into propionaldehyde. A liquid product comprising propionaldehyde, allyl acetate, water, acetic acid and optionally unreacted allyl alcohol, can be obtained from the gaseous reaction product by cooling. The propionaldehyde can be isolated from this mixture, for example, by distillation. A mixture of allyl acetate and water and optionally allyl alcohol can be removed overhead from the residual mixture in a distillation column, and the mixture of water and acetic acid obtained as a sump product. The head product can be recycled into the allyl acetate hydrolysis stage. In this way, the allyl acetate is completely converted into allyl alcohol. In addition, the unreacted allyl alcohol and the allyl alcohol reformed during hydrolysis is returned through this recycling to the reaction, yielding propionaldehyde, and finally can be completely converted into propionaldehyde. The acetic acid chemically combined in the allyl acetate is completely liberated by hydrolysis and obtained at the lower end of the column in the form of aqueous acetic acid. This aqueous acetic acid can then be recycled into the reaction with propylene and oxygen to form allyl acetate. This closes the acetic acid circuit and it is only propylene and oxygen that are required as starting materials for the production of propionaldehyde. By coupling the processes in this way, it is possible to produce propionaldehyde from allyl alcohol by an economically advantageous process because it is only propylene and oxygen that are required as the starting materials.

Modifications of the process described above are of course also possible. For example, mixtures of allyl alcohol, allyl acetate and water or mixtures of allyl alcohol, water and acetic acid or mixtures of allyl alcohol and water can initially be obtained from the reaction product of the allyl acetate hydrolysis and used for the reaction yielding propionaldehyde. In cases where mixtures of allyl alcohol, allyl acetate and water are used as the starting materials, the residual reaction mixture can be returned to the hydrolysis stage following separation of the propionaldehyde from the reaction product. The sump product left following the separation of allyl alcohol, allyl acetate and water by distillation from the allyl acetate hydrolysis product, is aqueous acetic acid which represent the acetic acid combined in the allyl acetate and which can be directly recycled into the reaction of propylene with oxygen and acetic acid.

In cases where a mixture of allyl alcohol, water and acetic acid is used for the reaction to give propionaldehyde, the reaction can be displaced so that the allyl alcohol is completely converted into propionaldehyde. Following separation of the propionaldehyde, the residual aqueous acetic acid can be directly recycled for use in the reaction of propylene, oxygen and acetic acid. In cases where a mixture of allyl alcohol and water is obtained from the hydrolysis product, an almost complete conversion of the allyl alcohol into propionaldehyde can also be obtained so that following separation of the propionaldehyde it is only a water phase which is obtained and which can be discharged as an effluent.

It can thus be seen that the production of allyl acetate from propylene, acetic acid and oxygen and the hydrolysis of the allyl acetate into allyl alcohol can be coupled in different ways with the reaction of allyl alcohol into propionaldehyde. The main characteristic of all these modifications is that the acetic acid combined in the allyl acetate is recovered and, advantageously in the form of aqueous acetic acid, can be recycled to the reaction of propylene with oxygen and acetic acid to form allyl acetate. This means that no acetic acid is required for the production of propionaldehyde; instead the reaction proceeds in accordance with equation:

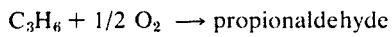

$$C_3H_6 + 1/2\ O_2 \longrightarrow \text{propionaldehyde}$$

The process of this invention is illustrated by the attached FIGURE: allyl alcohol in gaseous phase is supplied by line 1 into the reactor 6 which contains on a support a palladium containing catalyst. The gaseous reaction product is supplied by line 2 into the condenser 7 and afterwards by line 3 into the cooling device 8. By line 4 a gaseous phase is removed consisting of ethylene, ethane, CO and hydrogen whereas by line 5 propionaldehyde is removed in liquid phase.

The invention will be further described in the following illustrative examples.

EXAMPLE 1

900 ml of a catalyst containing 3.3 g of metallic palladium on a silica support in the form of beads with a diameter of 5 mm and an inner surface of 120 m²/g, were introduced into a reaction tube 2 meters long with an internal diameter of 25 mm. 15 mols per hour of nitrogen, 22 mols per hour of water and 2 mols per hour of allyl alcohol were passed over the catalyst in the gaseous phase at a temperature of 140°C and under a pressure of 0.5 atmosphere gauge. The test was carried out over a period of 200 hours during which the test results were constant. 95% of the allyl alcohol used were reacted. Of the allyl alcohol reacted, 96.5% were converted into propionaldehyde and 3.5% into gaseous compounds such as carbon monoxide, hydrogen, ethane and ethylene.

EXAMPLE 2

The procedure was as in Example 1 except that the catalyst used contained 3.5 g of metallic palladium and 1.5 g of metallic gold per liter of the silica support in the form of beads with a diameter of 5 mm and an inner surface of 170 m²/g. 7 mols per hour of nitrogen, 22 mols per hour of water and 2 mols per hour of allyl alcohol were passed over the catalyst. 100% of the allyl alcohol used were reacted. Of the allyl alcohol reacted, 94% were converted into propionaldehyde and 6% into gaseous products such as carbon monoxide, hydrogen, ethane and ethylene.

EXAMPLE 3

The procedure was as in Example 1, except that 2 mols per hour of acetic acid were additionally passed over the catalyst. The results obtained were similar to those obtained in Example 1, the presence of acetic acid not having any detectable influence on the test results.

EXAMPLE 4

The procedure was as in Example 3, except that 1 mol per hour of allyl acetate was additionally passed over the catalyst. The test results obtained were very similar to those of Examples 1 and 3.

EXAMPLE 5

The procedure was as described in Example 2 except that the catalyst used contained palladium and gold in the form of their hydroxides. 44 mols per hour of water and 4 mols per hour of allyl alcohol in the gaseous phase were passed over the catalyst at 140°C/0.5 atmospheres gauge pressure. Of the allyl alcohol used, 100% were reacted. Of the allyl alcohol reacted, 95% were converted into propionaldehyde and 5% into gaseous products such as carbon monoxide, hydrogen, ethane and ethylene.

It will be appreciated that the instant specification and examples are set forth by way of illustration and not limitation, and that various modifications and changes may be made without departing from the spirit and scope of the present invention.

What is claimed is:

1. A process comprising passing allyl alcohol in the gas phase over a supported palladium and gold catalyst at a temperature of about 50° to 250°C whereby the allyl alcohol is converted to propionaldehyde, the palladium being present in about 0.1 to 10 g per liter of catalyst and for each 0.1 to 10 g of palladium there being present about 0.1 to 5 g of gold.

2. A process as claimed in claim 1, wherein the conversion is carried out in the absence of oxygen.

3. A process as claimed in claim 1, wherein the reaction is carried out at a pressure up to about 10 atmospheres gauge.

4. A process as claimed in claim 1, wherein the reaction is carried out in the presence of a diluent comprising at least one of nitrogen, hydrogen, carbon monoxide, carbon dioxide, ethane, ethylene, water vapor, acetic acid and allyl acetate.

5. A process as claimed in claim 1, wherein the gaseous reaction product is cooled to a temperature below about 50°C to form a liquid phase and a gaseous phase, the propionaldehyde is separated from the liquid phase by distillation, and the gaseous phase is recycled at least in part to the conversion.

6. A process as claimed in claim 5, wherein prior to the conversion propylene is reacted with oxygen and acetic acid to form allyl acetate mixed with acetic acid, the mixture is hydrolyzed to form allyl alcohol and acetic acid, and the allyl alcohol along with at least some of the acetic acid as diluent is used as the feed for the conversion.

7. A process as claimed in claim 6, wherein water vapor is present during the reaction of propylene with oxygen and acetic acid which reaction takes place in vapor phase, the products being cooled to form a liquid condensate containing the allyl acetate and acetic acid and also water which is used as the feed for the conversion.

8. A process as claimed in claim 7, wherein a portion of the acetic acid in the liquid condensate is removed therefrom and recycled for reaction with additional propylene and oxygen to form allyl acetate.

9. A process according to claim 8, wherein the conversion is carried out in the absence of oxygen at a temperature ranging from about 100° to 200°C and a pressure ranging up to about 10 atmospheres gauge, the catalyst containing palladium and gold on a support, any unconverted allyl alcohol left in the reaction product after removal of the propionaldehyde being recycled for further conversion.

* * * * *